(No Model.) 2 Sheets—Sheet 2.

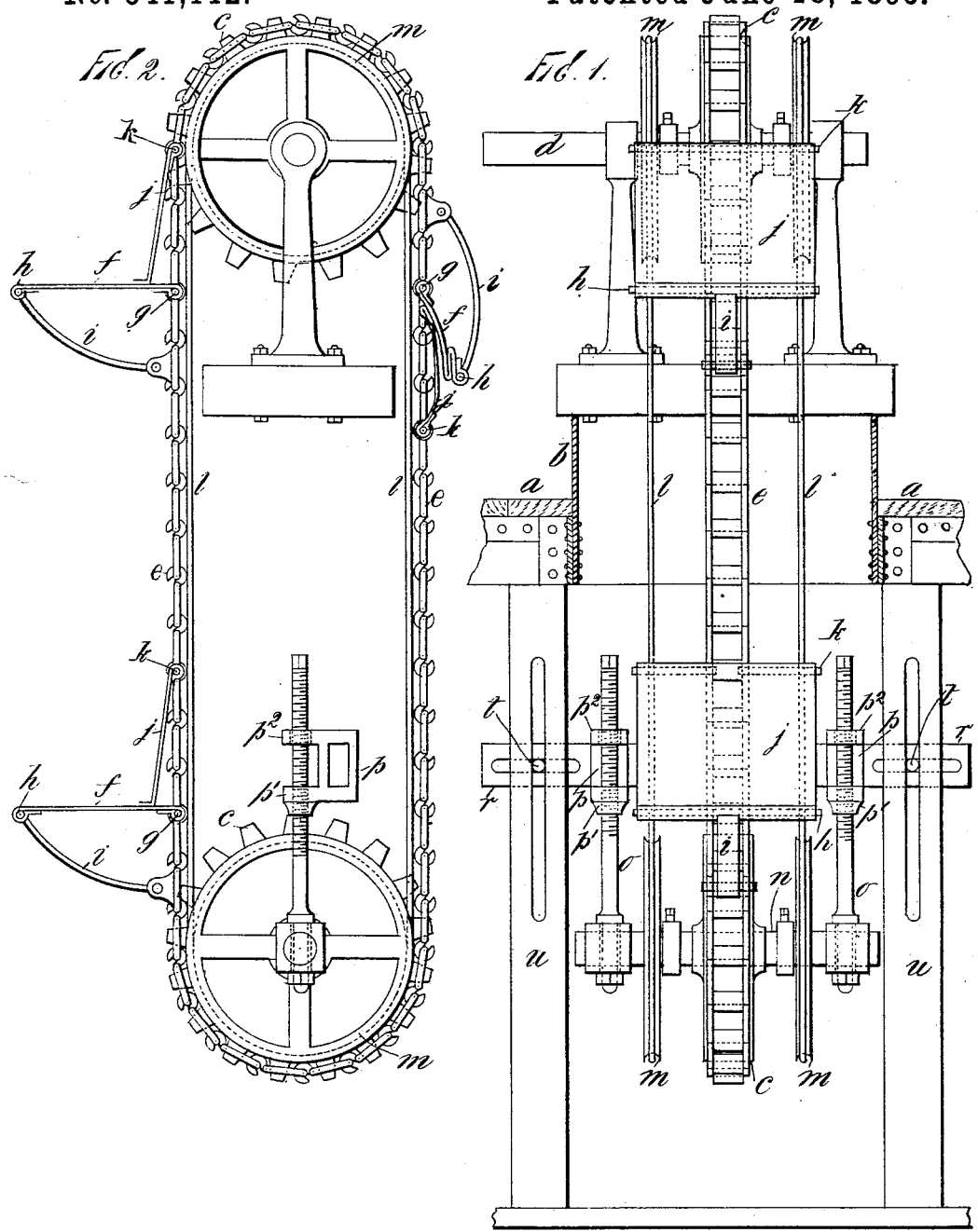

J. McINTYRE & H. A. KESSEL.
CONVEYER.

No. 541,112. Patented June 18, 1895.

UNITED STATES PATENT OFFICE.

JOHN McINTYRE, OF JERSEY CITY, NEW JERSEY, AND HENRY A. KESSEL, OF BROOKLYN, NEW YORK.

CONVEYER.

SPECIFICATION forming part of Letters Patent No. 541,112, dated June 18, 1895.

Application filed December 26, 1893. Serial No. 494,642. (No model.)

*To all whom it may concern:*

Be it known that we, JOHN McINTYRE, residing at Jersey City, in the county of Hudson and State of New Jersey, and HENRY A. KESSEL, residing at Brooklyn, in the county of Kings and State of New York, citizens of the United States, have invented a new and useful Improvement in Conveyers, of which the following is a specification, reference being had therein to the accompanying drawings, wherein—

Figure 3:
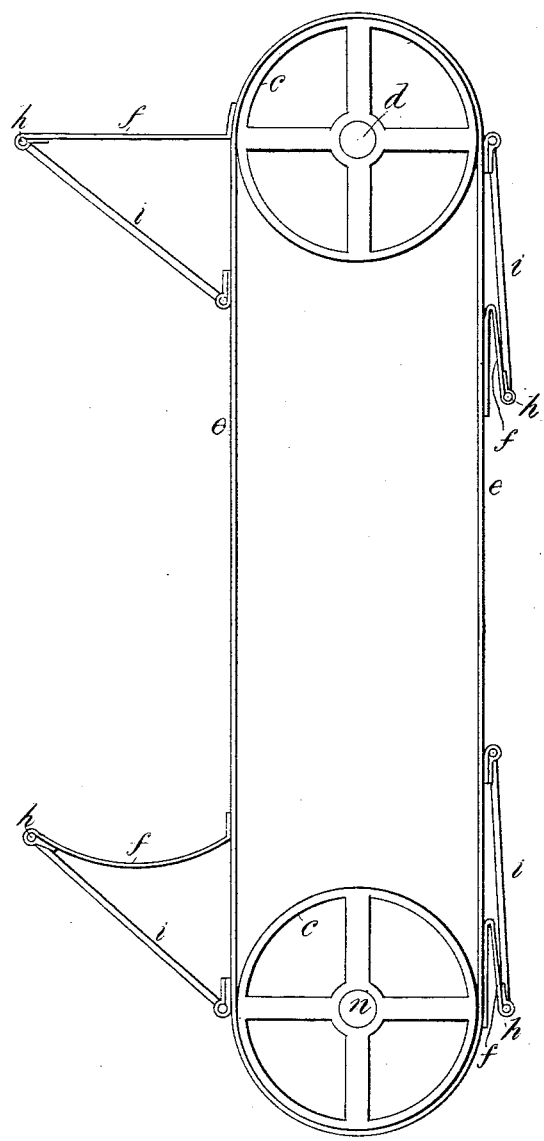
Figure 4:
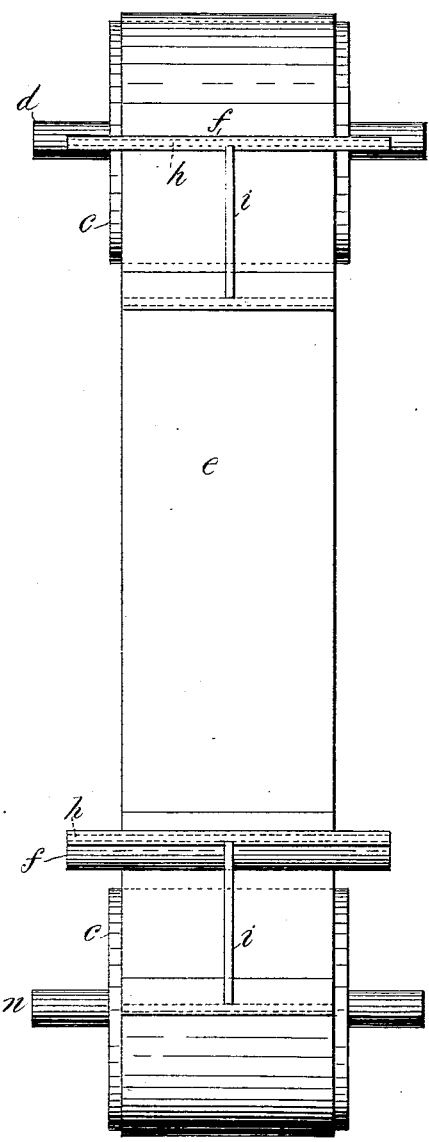

Figure 1 is an elevational view—a "front" view, so to speak—showing a few of the elevating shelves or cushions. Fig. 2 is a side view of the same. Fig. 3 is a side view showing a modification. Fig. 4 is a front view of said modification.

The object of the improvement is the production of a conveyer specially useful for elevating bananas and other soft fruits from the hold to the deck of a ship.

In conveyers as heretofore constructed, the delicate banana or other soft fruit is seriously damaged on being hoisted from the ship's hold by the hard, unyielding arms or brackets on which the fruit is laid. Furthermore, the said arms or brackets being incapable of conforming to the continually varying sizes and forms of the bunches of fruit in connection with the vibration of the belt, allow the fruit to oscillate and chafe itself, thereby further reducing its value.

With the conveyer presently to be described, we are enabled to receive and lift or hoist the fruit from the ship's hold to the upper deck with a minimum of injury to the fruit.

The letter $a$ denotes the deck of a vessel and $b$ a portion of the hatch-way, upon which the upper one of the two belt-wheels $c$ is mounted, the requisite rotary motion being imparted to the conveyer through the medium of the shaft $d$.

The letter $e$ denotes an endless belt. Shown in the drawings as a metallic chain. It runs over and upon the two belt-wheels $c, c$ which are preferably sprocket wheels when the belt is composed of a chain.

The letter $f$ denotes the elevator shelves which are attached to the endless belt at regular and proper intervals. They are of flexible and yielding material, such as rubber or canvas, so as not to bruise the fruit which is placed upon them and for other purposes, wherefore they are called herein "yieldable platforms." These yieldable platforms are normally taut, that is to say, when no fruit is placed upon them, they are taut on the upward side of the conveyer as shown in Fig. 1. They fold closely to the belt on the downward side, thus allowing of compactness in the machine and safety and protection from projecting parts. These platforms automatically unfold themselves into the proper position to receive the fruit on turning around the lower pulley. This folding feature of our conveyer is of further great advantage, in that it permits the person taking the fruit off the platform to stand close to the belt on the downward side, thus avoiding the danger of being struck by the conveyer flights as ordinarily constructed. Again, our conveyer, being preferably a portable one, this folding feature permits of the belt being rolled up for transportation like any ordinary belt, thus avoiding the necessity of taking off the conveyer flights and dismembering the machine. These yieldable platforms are attached to the belt through the medium of the rod $g$ which projects laterally both ways, from the opposite edges of the belt. They are also attached to the rod $h$ and from this latter rod the platform-support $i$ runs to the belt and is jointed thereto.

It results from the use of the yieldable platform and the platform-support jointed to the belt that when the bunch of bananas is laid upon the yieldable-platform, the platform bends downward at its central part and the outer end of the platform-support moves inward, causing the platform to exert something of a grasping action upon the bunch of fruit.

The letter $j$ denotes a fender or apron of canvas or the like extending from the yieldable-platform upward to the rod $k$ which extends laterally in both directions from the opposite edges of the belt. This fender $j$ serves the purpose of preventing the fruit, which is upon the yieldable-platform, from coming in contact with the endless belt, a result that is desirable, when that belt is a chain.

The letters $l$ denote stays behind the rods $g$ which prevent them from turning or twisting out of proper position as they move along their path. These endless stays pass over the wheels $m$.

The lowermost of the two belt-wheels $c$ is loose upon the shaft $n$. That shaft is supported by the screw-threaded rods $o$, the connection between the two being such that the screw-threaded rods are free to rotate. These screw-threaded rods mesh with female threads in the spurs $p'$ and pass up through the spurs $p^2$ which are not threaded but act as guides. The spurs $p'$ and $p^2$ are parts or appurtenances of the sleeves $p$ which are supported by and can have lateral motion upon the bar $r$. The upper ends of the rods $o$ are squared and by means of a wrench taking hold thereof, these screw-threaded rods can be rotated and the tension of the endless belt thereby regulated and adjusted.

The letters $t$ denote bolts, with heads and nuts, passing through horizontal mortises in the bar $r$ and vertical mortises in the uprights $u$ by means of which arrangement the bar $r$ can be adjusted both vertically and horizontally.

In the modification illustrated in Figs. 3 and 4, the endless belt is shown as made of canvas and without the stays. The lower flight on the upward side of Fig. 3 illustrates the action of the yieldable platform $f$ when a bunch of fruit is placed thereon.

What we claim, and desire to secure by Letters Patent, is—

1. In a conveyer, the combination of the belt $e$, a normally taut yieldable-platform of textile material and the platform-support $i$, all substantially as described and for the purposes set forth.

2. In a conveyer, the combination of the belt $e$, the fender $j$, the yieldable-platform $f$, and the platform-support $i$, all substantially as described and for the purposes set forth.

3. In a conveyer, the combination of the belt $e$, the fender $j$, a normally taut yieldable-platform of textile material and the platform-support $i$, all substantially as described and for the purposes set forth.

4. In a conveyer, the combination of the belt $e$, the rod $g$ projecting laterally from opposite sides of the belt, a normally taut yieldable-platform of textile material, and the platform-support $i$ jointed to the belt, all substantially as described and for the purposes set forth.

5. In a conveyer, the combination of the belt $e$, the rod $g$ projecting laterally, from opposite edges of the belt, a normally taut yieldable-platform of textile material and the stays $l$, all substantially as described and for the purposes set forth.

6. In a conveyer, the combination of the belt $e$, the rod $g$ projecting laterally from opposite sides of the belt, a normally taut yieldable-platform of textile material, the endless stays $l$ and the wheels $m$, all substantially as described and for the purposes set forth.

7. In a conveyer, the combination of the belt $e$, the yieldable-platform $f$, and the platform-support $i$, the belt-wheels $c, c$, the wheel-shaft $n$, the bar $r$, and the adjusting screws $o$ laterally movable upon the bar, all substantially as described and for the purposes set forth.

8. In a conveyer, a conveyer flight consisting of a platform normally taut, said platform being capable of yielding to the pressure of the article to be conveyed, and having its support journaled to the belt substantially as described and for the purposes set forth.

9. In a conveyer, a conveyer flight consisting of a yieldable platform, capable of exerting a grasping action on the article to be conveyed, and having its support journaled to the belt, substantially as described and for the purposes set forth.

10. In a conveyer, a conveyer flight consisting of an automatically folding yieldable platform journaled to the belt, substantially as described and for the purposes set forth.

11. In a conveyer, a conveyer flight consisting of an automatically folding and unfolding yieldable platform journaled to the belt, substantially as described and for the purposes set forth.

JOHN McINTYRE.
HENRY A. KESSEL.

Witnesses:
ALFRED W. KIDDLE,
N. L. FROTHINGHAM.